US008122786B2

(12) United States Patent
Kirchner

(10) Patent No.: US 8,122,786 B2
(45) Date of Patent: Feb. 28, 2012

(54) PARKING LOCK ARRANGEMENT

(75) Inventor: Markus Kirchner, Tamm (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 308 days.

(21) Appl. No.: 11/846,477

(22) Filed: Aug. 28, 2007

(65) Prior Publication Data
US 2008/0053170 A1 Mar. 6, 2008

(30) Foreign Application Priority Data

Sep. 1, 2006 (DE) .......................... 10 2006 042 637

(51) Int. Cl.
*G05G 1/00* (2006.01)
*G05G 3/00* (2006.01)
*F16D 63/00* (2006.01)

(52) U.S. Cl. ........ 74/575; 74/577 R; 74/577 M; 74/578; 188/82.77

(58) Field of Classification Search ................ 74/877 R, 74/877 S, 875, 457, 640, 462, 437, 575, 578, 74/577 S; 70/174; 188/82.77, 31, 69, 169 BA
See application file for complete search history.

(56) References Cited

U.S. PATENT DOCUMENTS

| | | | | |
|---|---|---|---|---|
| 2,801,656 A | * | 8/1957 | Ford | 144/250.13 |
| 5,964,335 A | * | 10/1999 | Taniguchi et al. | 192/219.5 |
| 6,527,037 B2 | * | 3/2003 | Daus et al. | 160/315 |
| 6,655,505 B2 | * | 12/2003 | Oppitz et al. | 188/82.77 |
| 6,659,018 B1 | * | 12/2003 | Jackson | 105/404 |
| 6,840,884 B2 | * | 1/2005 | Wang et al. | 475/230 |
| 6,997,075 B2 | * | 2/2006 | Serebrennikov et al. | 74/339 |
| 2002/0092710 A1 | | 7/2002 | Oppitz et al. | |
| 2004/0237694 A1 | | 12/2004 | Lindenschmidt et al. | |

FOREIGN PATENT DOCUMENTS

DE 693 083 7/1940
DE 845 126 7/1952

(Continued)

OTHER PUBLICATIONS

European Search Report, Patent No. EP 07013845.8 dated Jan. 17, 2008.

*Primary Examiner* — Vinh T. Luong
(74) *Attorney, Agent, or Firm* — Knobbe, Martens, Olson & Bear, LLP

(57) ABSTRACT

Locking arrangement for locking a first element which is movably mounted in a first direction, by means of a second element which is movably mounted in a second direction transversely with respect to the first direction. First element has a toothed contour with at least two teeth and a tooth gap which lies between. Second element has a projection which has a projection length which is shorter than the tooth gap length. The projection can be introduced into tooth gap when there is movement in the second direction, to lock the first element. Each tooth has a face which points towards the second element and has a first contour. Projection has a face which points towards the first element and has a second contour. First and second contours are matched to one another so that the projection is deflected by the teeth from becoming inserted into tooth gap if first element moves faster than a predetermined locking speed and slower than a maximum speed of first element.

6 Claims, 3 Drawing Sheets

FOREIGN PATENT DOCUMENTS

| | | |
|---|---|---|
| DE | 27 33 884 | 2/1978 |
| DE | 3638045 A1 | 5/1988 |
| DE | 199 43 519 | 3/2001 |
| DE | 103 10 977 | 9/2004 |
| DE | 10 2004 021 981 | 11/2004 |
| EP | 1103744 A2 | 5/2001 |
| JP | 59073627 * | 4/1984 |
| JP | 04085153 A | 3/1992 |
| JP | 11094081 * | 4/1999 |

\* cited by examiner

PARKING LOCK ARRANGEMENT

CROSS REFERENCE TO RELATED APPLICATIONS

This application claims the priority of German patent application DE 10 2006 042 637 filed Sep. 1, 2006.

BACKGROUND OF THE INVENTION

The present invention relates to a locking arrangement for locking the mobility of a first element which is movably mounted in a first direction, by means of a second element which is movably mounted in a second direction transversely with respect to the first direction, in particular in the form of a parking lock arrangement for a vehicle transmission, wherein the first element has a toothed contour with at least two teeth and a tooth gap which lies between them, wherein the tooth gap has a tooth gap length in the first direction, wherein the second element has a projection which has, in the first direction, a projection length which is shorter than the tooth gap length, wherein the projection can be introduced into the tooth gap when there is a movement in the second direction, in order to lock the first element, wherein the teeth each have a face which points towards the second element and has a first contour, and wherein the projection has a face which points towards the first element and has a second contour, wherein the first and second contours are matched to one another in such a way that the projection is deflected by the teeth from becoming inserted into the tooth gap if the first element moves at a speed which is higher than a predetermined locking speed and lower than a maximum speed of the first element.

In automatic vehicle transmissions, all the gear speeds are disengaged when the vehicle is parked. In such transmissions, the vehicle is generally prevented from rolling away by a parking lock mechanism, irrespective of the activation of the handbrake. The parking lock mechanism generally has a parking lock wheel with toothing, which wheel is secured to an output shaft of the vehicle transmission. In addition, the parking lock mechanism generally has a pawl which is mounted fixed to the housing and can be introduced into the toothing of the parking lock wheel manually or by means of an actuator in order to lock the output shaft of the transmission against rotation (thus preventing the vehicle from rolling away).

Such parking locks are generally configured in such a way that the pawl can engage even at a low relative speed. This can ensure reliable engagement of the parking lock mechanism even if the parking lock mechanism is activated at a time at which the pawl and a tooth lie directly opposite one another.

On the other hand, the parking lock mechanisms are configured in such a way that at relatively high rotational speeds the pawl cannot block the parking lock wheel even if the pawl is actively operated. This is because this would possibly result in immediate destruction of the parking lock mechanism or of the vehicle transmission.

At such relatively high rotational speeds and when the parking lock is, for example, inadvertently activated the pawl "ratchets" over the toothing. In such a case the pawl is deflected from the toothing owing to the geometries which are selected.

It is problematic here that the components involved are subjected to high mechanical stress when this "ratcheting" occurs.

DE 10 2004 021 981 A1 discloses that a chamfer is provided at the base of the locking pawl. This is intended to ensure that at relatively high velocities of the vehicle (for example higher than 10 km per hour) the locking pawl is deflected over the flattened chamfer in the base of the locking pawl. This is intended to reduce the loading of the components which are involved.

Document DE 199 43 519 A1 also discloses securing a parking lock mechanism electronically. Here, an actuating element is permitted to engage a parking lock mechanism only as a function of certain parameters, for example if the speed of the vehicle is below a certain limiting value.

Document DE 103 10 977 A1 discloses a parking lock mechanism in which a parking lock toothing is provided on an axial front side of a gearwheel which is permanently connected to the transmission output shaft.

BRIEF SUMMARY OF THE INVENTION

Against the background outlined above, the object of the invention is to disclose an improved locking arrangement in which the stressing of the components involved when the locking arrangement is activated incorrectly is reduced.

This object is achieved in the locking arrangement mentioned at the beginning by virtue of the fact that the first and/or second contours are rounded in such a way that at speeds of the first element over the entire range from the locking speed up to the maximum speed the projection is deflected with a small maximum momentum value.

By virtue of the inventive rounding of the first and/or second contours it can be achieved that the second element is generally deflected with relatively low momentum values. If the first element moves in the region of the maximum speed (for example a rotation of the parking lock wheel at a highway speed of for example 150 km/h in the case of a parking lock mechanism) the second element is pushed back less violently (with a smaller momentum) owing to the rounded shape. Even if the locking arrangement is incorrectly activated this leads to a significant reduction in the loading of the involved components at speeds in the region of the maximum speed. In particular, peak stresses on the first and second elements can be reduced. As a result, the locking arrangement can be constructed and implemented in a more lightweight fashion which is optimized with respect to costs, use of materials and manufacturing requirements. For example, the first and/or second elements can be embodied as punched parts since a punching process can be implemented owing to the reduced thickness.

The object is thus achieved completely.

It is particularly preferred here if the rounding of the first and/or second contours corresponds to a logarithmic function.

It has become apparent that such a logarithmic function meets to the greatest extent the requirements of a smallest possible momentum value over a speed range which is as large as possible.

It is particularly advantageous here if the rounding of the first and/or second contours corresponds to the function of a natural logarithm.

It has become apparent that the use of a natural logarithm permits even better results in terms of the reduction in the momentum value over a large speed range than, for example, a logarithm using base 10 or base 2 even though such functions also generally provide an improvement over contours with a chamfer.

It is particularly advantageous if the rounding corresponds to a section of the following function:

$$\bar{y} = K1 \cdot \text{logarithm}(\bar{x} + K2),$$

where the $\bar{x}$ direction corresponds to the first direction, and where the $\bar{y}$ direction corresponds to the second direction, and where K1 and K2 are constants which depend essentially on geometric variables of the parking lock arrangement.

The section of the function which is used to form the contour or contours can be determined, for example, by means of a coordinate transformation.

The geometric variables meant here can be in particular the length of the tooth gaps of the first element in the first direction, the length of the projection of the second element in the first direction, the gap play between the projection and the tooth gap in the engaged state etc.

It is particularly advantageous if the constant K1 is also dependent on an average approach angle which is set up between the first and second contours when the first element is moving and when said contours abut against one another.

Such an average engagement angle can be, for example, in the range from 1 degree to 5 degrees, preferably in the range from 2 degrees to 2.5 degrees, in typical parking lock systems for motor vehicles.

A second factor of the constant K2 can depend here in turn on geometric variables of the parking lock arrangement such as, for example, those mentioned above.

In particular it is advantageous if the constant K1 contains a factor which is formed by the value of the tangent of the average approach angle.

It has been shown that taking into account the average approach angle by means of the tangent function contributes to enabling the value of the deflecting momentum to be reduced over essentially the entire speed range from the locking speed up to the maximum speed.

According to a further overall preferred embodiment, only the first contour or only the second contour is rounded in accordance with a logarithmic function, in which case the other contour extends in the direction of movement.

For example, the rounding according to the invention can be formed exclusively on the contour of the second element (locking pawl projection), while the other element is contoured in the direction of movement (that is to say is contoured so as to follow a circular shape in the case of a parking lock wheel).

Overall it is also preferred if the projection is deflected with essentially the same momentum value (constant momentum) over the entire range from the locking speed up to the maximum speed of the first element.

This makes it possible for peak loading of the involved components to occur at a low speed within this range. For this reason, low loading of the involved components can be achieved for all hazardous situations.

Even though it is preferred for the contouring according to the invention to be formed on the projection of the second element (parking lock pawl) it is, of course, also possible for such contouring to be formed on the first element, i.e. on the teeth of the first element (i.e. generally on the parking lock wheel).

The basic idea of the constant momentum is also significant because in the event of a failure of the vehicle transmission and at the same time incorrect activation of the parking lock mechanism the vehicle is braked or coasts from the instantaneous speed to a stationary state. For this reason it is of particular importance that no peak loads occur on the involved components over the entire speed range.

Compared to straight contours on the faces of the first and second element it is possible to reduce the stressing by 70% (i.e. reduction of the load to approximately 30% of previous value).

Even though it has proven particularly preferable if the rounding of the first and/or second contours corresponds to a logarithmic function, it is alternatively also possible if the rounding of the first and/or second contours corresponds to an exponential function.

Similar advantages as with use of a logarithmic function can essentially be achieved, in particular if the contour corresponds to an exponential function with the base "e".

Of course, the features which are mentioned above and are to be explained below can be used not only in the respectively specified combination but also in other combinations or alone without departing from the scope of the present invention.

BRIEF DESCRIPTION OF THE SEVERAL VIEWS OF THE DRAWING

Exemplary embodiments of the invention are illustrated in the drawing and are explained in more detail in the following description. In said drawing.

DETAILED DESCRIPTION OF THE INVENTION

Figure 1:
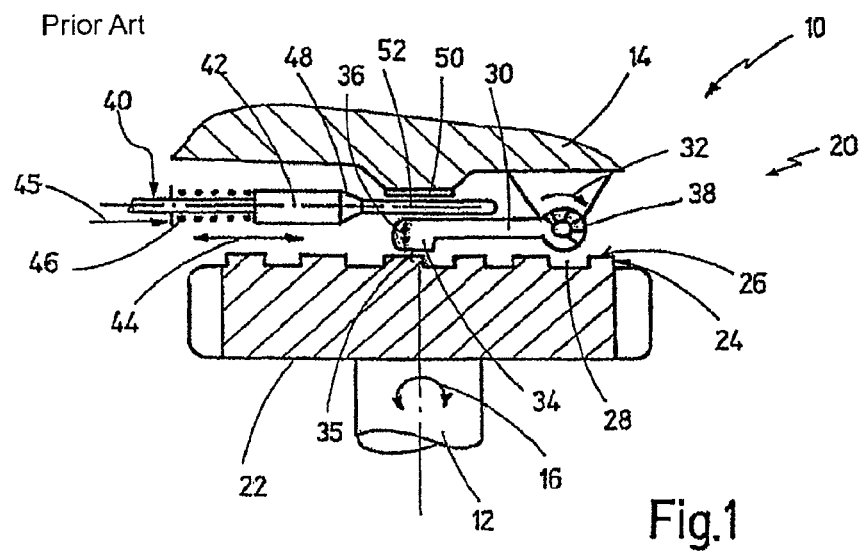
FIG. 1 is an illustration of a detail of a vehicle transmission with a parking lock arrangement according to the invention.

FIG. 1 illustrates a detail from a vehicle transmission 10 which has an output shaft 12 and a housing 14. The output shaft 12 can be rotated in two directions 16 and is rigidly coupled to drive wheels of the vehicle which is equipped with the transmission 10.

The transmission 10 also has a parking lock arrangement 20 which is configured according to the invention.

The parking lock arrangement 20 has a parking lock wheel 22 which is connected in a rotationally fixed fashion to the output shaft 12 of the transmission 10. In the present case, the parking lock wheel 22 is a gearwheel which is permanently connected to the output shaft 12, has the purpose of transmitting drive torque to the output shaft and is formed with a toothed contour 24 on an axial front side.

The toothed contour 24 extends, for example, about the axis of the transmission shaft 12 and has axially protruding teeth 26 and tooth gaps 28 which are set back axially, as is illustrated schematically in FIG. 1.

The parking lock arrangement 20 also has a parking lock pawl 30 which is rotatably mounted on the housing 14, as is illustrated by an arrow 32 in FIG. 1.

The parking lock pawl 30 has, at its free end, a projection 34 which is designed for engagement in a respective tooth gap 28 of the toothed contour 24.

A face of the projection 34 which points toward the toothed contour 24 is provided with a rounded projection contour 35 according to the invention.

When pivoting movements of the parking lock pawl 30 occur, the projection 34 can generally be moved in a direction 36 of movement which is oriented perpendicularly with respect to the direction 16 of movement of the parking lock wheel 22.

FIG. 1 also illustrates, in the region of the bearing of the parking lock pawl 30 on the housing 14, a spring 38 which is prestressed in the direction away from the parking lock wheel 22. This prevents the parking lock pawl 30 from engaging with the toothed contour 24 in the unactivated state.

In order to activate the parking lock arrangement 20, a parking lock actuator 40 is also provided which has a locking slide 42. The locking slide 42 can be moved in a direction 44 which extends approximately tangentially with respect to the direction 16 of rotation of the parking lock wheel 22.

The locking slide is moved in the direction of the parking lock pawl 30, as indicated by an arrow 45, by means of an actuator force. In this context, the force 45 firstly acts on a securing spring 46 which stores the actuation energy if the projection 34 is located directly opposite a tooth 26 at the time of activation.

As soon as the projection 34 is arranged over a tooth gap 28, a conical section 48 which is provided on the locking slide 42 forces the parking lock pawl 30 onto the parking lock wheel 22 and into the corresponding tooth gap 28. At the same time, the locking slide 42 can be supported on an abutment 50 on the housing 14 if this is structurally advantageous, as in the illustrated case.

Consequently, the parking lock wheel 22 is locked in the directions 16 of movement. A vehicle which is equipped with a vehicle transmission with such a parking lock mechanism can consequently not inadvertently roll away in the parked position.

If the parking lock is to be released again, the locking slide 42 is pushed back so that the spring 38 can force the projection 34 out of the tooth gap 28.

At low relative speeds between the parking lock pawl 30 and the toothed contour 24 (corresponding, for example, to speeds of the vehicle of 2 to 5 km per hour), the parking lock arrangement 20 can engage. However, engagement of the parking lock arrangement above such speed ranges is to be avoided in all cases since this may lead to considerable damage to the parking lock arrangement 20 and/or to the entire vehicle transmission 10.

This is achieved, on the one hand, by virtue of the fact that starting from such a limiting speed or locking speed the tooth gaps move past the locking pawl so quickly that they cannot engage completely in the tooth gaps in any case. Instead, the parking lock pawl is repeatedly deflected by the teeth of the parking lock wheel 22. This can take place with a considerable momentum if the projection 34 has already penetrated somewhat into a tooth gap so that one side of the projection 34 abuts against one side or edge of a tooth 26, which is generally rounded. This state is generally referred to as "ratcheting".

In the parking lock arrangement according to the invention (shown in FIG. 1) the projection contour 34 is formed rounded in such a way that at speeds of the parking lock wheel 22 over the entire range from the locking speed up to the maximum speed the projection is deflected with a small momentum value, in particular is deflected with an approximately constant value.

Irrespective of the speed at which a malfunction occurs and the parking lock arrangement 20 is actuated so as to engage, the parking lock pawl 30 can be deflected with a relatively low momentum value so that the loading of the involved components (parking lock pawl 30, parking lock wheel 22, parking lock actuator 40 etc.) can be reduced.

In the parking lock arrangement 20 in FIG. 1, the contours of the teeth 26 which lie opposite the projection contour 35 are embodied so as to be straight in each case. However, it is conceivable for these contours also to be embodied so that they are round, in order to achieve the object according to the invention.

The rounding of the projection contour 35 essentially follows a logarithmic curve, with the distance between the contours of the projection 34 or of the teeth 26 which lie opposite one another being larger in the region of a rear tooth side than in the region of a front tooth side. The front tooth side is here that side which lies at the front in the customary direction 16 of movement of the parking lock wheel 22 (this is usually the direction when the vehicle travels forward).

Generally, the rounding of the projection contour 35 (and if appropriate of the contour of the teeth 26) is asymmetrical in the direction 16 of movement in each case. In other words, the parking lock pawl 30 is to be deflected in particular in the case of forward travel. In the case of reverse travel high speeds are not achieved in any case so that optimization in this respect is generally not a high priority.

Figure 2:
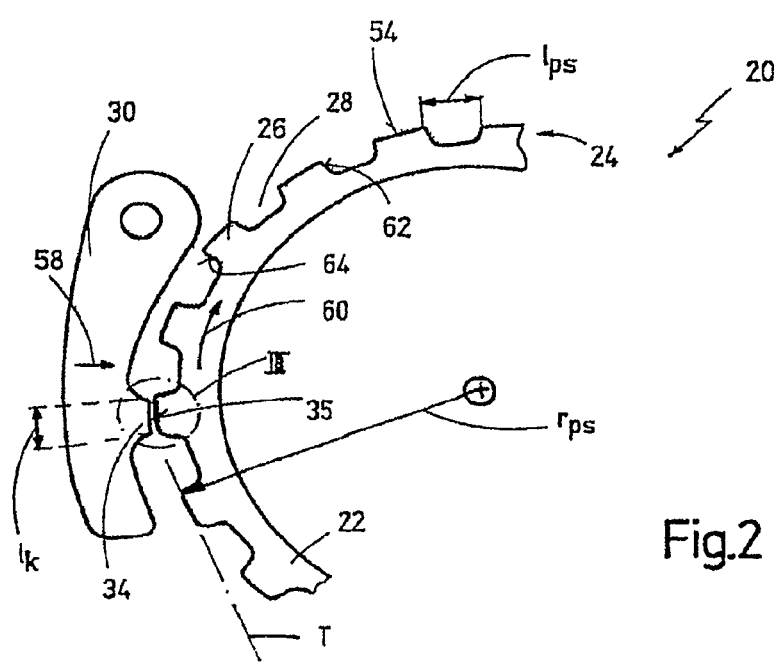
FIG. 2 shows a parking lock arrangement according to a further embodiment of the present invention.

FIG. 2 shows an alternative embodiment of a parking lock arrangement according to the invention for a motor vehicle transmission.

The parking lock arrangement 20 in FIG. 2 corresponds generally to the parking lock arrangement 20 in FIG. 1 in terms of design and method of functioning. Only differences are explained below.

On the one hand, in the case of the parking lock wheel 22 the toothed contour 24 is formed on the external circumference. In the corresponding way, the parking lock pawl 30 can pivot about an axis which extends parallel to the rotational axis of the parking lock wheel 22.

Figure 3:
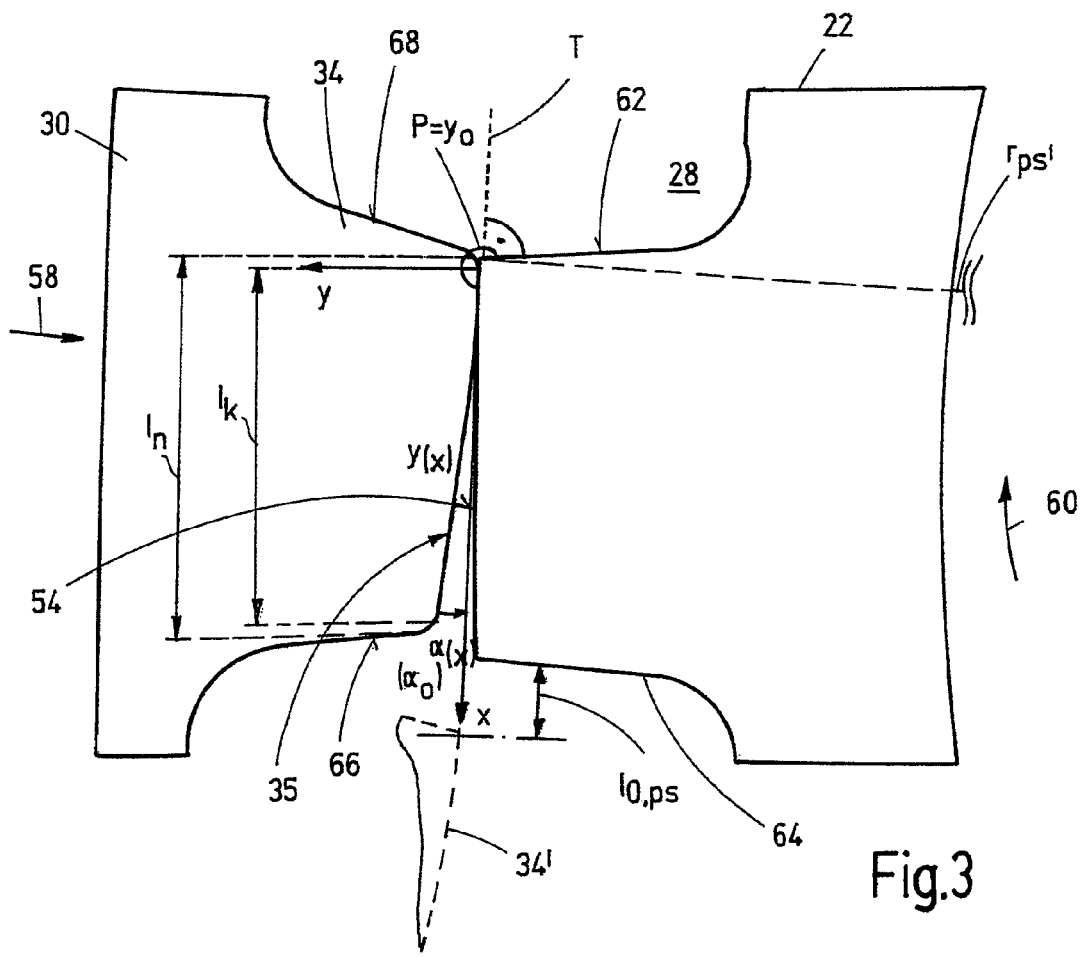
FIG. 3 is an illustration of a detail III in FIG. 2.

FIG. 3 shows a view of the detail III from FIG. 2.

A face of the respective tooth 26 which points toward the parking lock pawl is designated generally by 54 in FIGS. 2 and 3. The direction of movement of the parking lock pawl 30 in the locking direction is designated by 58 in FIGS. 2 and 3 (this direction corresponds to the direction 36 in FIG. 1). In addition, the direction of movement of the parking lock wheel 22 in the case of forward travel is designated by 60 (corresponding to the rotational direction 16 in the case of forward travel).

Generally, the sides of the teeth 26 which are respectively located at the front in the forward direction 60 of travel are designated by 62, and sides at the back are respectively designated by 64. In a corresponding way, a front side of the projection 34 of the parking lock pawl 30 is designated by 66, and a rear projection side by 68.

The upper designations are such that when the parking lock wheel 22 moves in the forward direction 60 the respective front tooth sides 62 of the teeth 26 approach the front projection side 66, and the rear tooth side 64 moves away from the rear projection side 68 as it passes the projection 34.

In addition, FIGS. 2 and 3 show a number of typical geometric dimensions of the parking lock arrangement 20, specifically as follows:

$l_{PS}$ length of a tooth gap 28 in the direction 60 of movement $r_{PS}$ external radius of the parking lock wheel 22

$l_K$ length of the projection 34 in the direction 60 of movement (without rounding radii)

$l_n$ length of the projection 34 in the direction 60 of movement (with rounding radii)

T tangent of the external radius $r_{PS}$ starting from the point P of contact of the parking lock wheel 22 with the projection 34

$L_{0,PS}$ play of the tooth side between the projection 34 and tooth side ($l_{0,P} = l_{PS} - l_n$)

P that contact point (to be precise, contact line) between the projection contour 35 and the toothed contour 54 lying opposite which lies as close as possible to the front tooth side 62 or the rear projection side 68; this point preferably forms the zero point of the section of the rounding function (preferably logarithmic functions) which is used to form the projection contour 35.

α angle between the tangent T and the projection contour 35 starting from the respective contact point P $α_o$ average approach angle x coordinate axis for describing the projection contour 35, coincides with the tangent T y coordinate axis for describing the projection contour 35, perpendicular to the axis x and starting from the contact point P in the direction away from the parking lock wheel 22

The projection contour 35 is rounded according to the invention in such a way that at speeds of the parking lock wheel 22 over the entire range from the locking speed (approximately 2 to 5 km per hour) up to the maximum speed (for example 150 km per hour or significantly more) the projection 34 is deflected with essentially the same momentum value.

In this context, the projection contour 35 is formed so as to start from the rear projection side 68 in such a way that the contour extends further and further away from the tangent T or from the toothed contour 54. Basically, the method of deflecting the parking lock pawl 30 according to the invention is achieved preferably if the projection contour 35 is not made planar or polygonal but rather as a continuously rounded surface which, starting from the rear projection side 68 and extending to the front projection side 66 moves increasingly away from the external circumferential circle of the parking lock wheel 22.

It is particularly preferred if this projection contour 35 follows the form of a logarithmic function, as is illustrated, for example, in FIG. 3.

In general terms, the projection contour 35 in the embodiment in FIGS. 2 and 3 follows a function $\bar{y}(\bar{x})=K1 \cdot \text{*logarithm}(\bar{x}+K2)$ where K1 and K2 are constants which depend essentially on geometric variables of the parking lock arrangement 20, for example the tooth gap length $l_{PS}$ of the projection length $l_K$, the play $l_{0,PS}$ between the tooth sides. In addition, the constant K1 can also be dependent on the average approach angle $α_0$, for example by virtue of the fact that the function tangent $α_0$ forms a factor of the constant K1 (for example $K1=K1' \cdot \tan(α_0)$).

The angle α depends on how the contact point lies on the projection side 35, that is to say essentially on the relative position between the projection 34 and tooth 26. The average approach angle $α_0$ constitutes a geometric simplification. To be more precise, the average approach angle $α_0$ corresponds to that angle when the projection 34 has a planar chamfer at the base of the parking lock pawl 30 instead of a rounded contour according to the invention.

In the embodiment in FIGS. 2 and 3, the logarithm is a natural logarithm ($l_n$).

Generally, according to the invention it is possible for the projection 34 to be deflected with essentially the same momentum of value at speeds of the parking lock wheel 22 over the entire range from the parking lock speed up to the maximum speed, in which case this momentum value is relatively low.

Loading of the involved components in the event of incorrect activation of the parking lock arrangement 20 is therefore avoided over the entire speed range.

Figure 4:
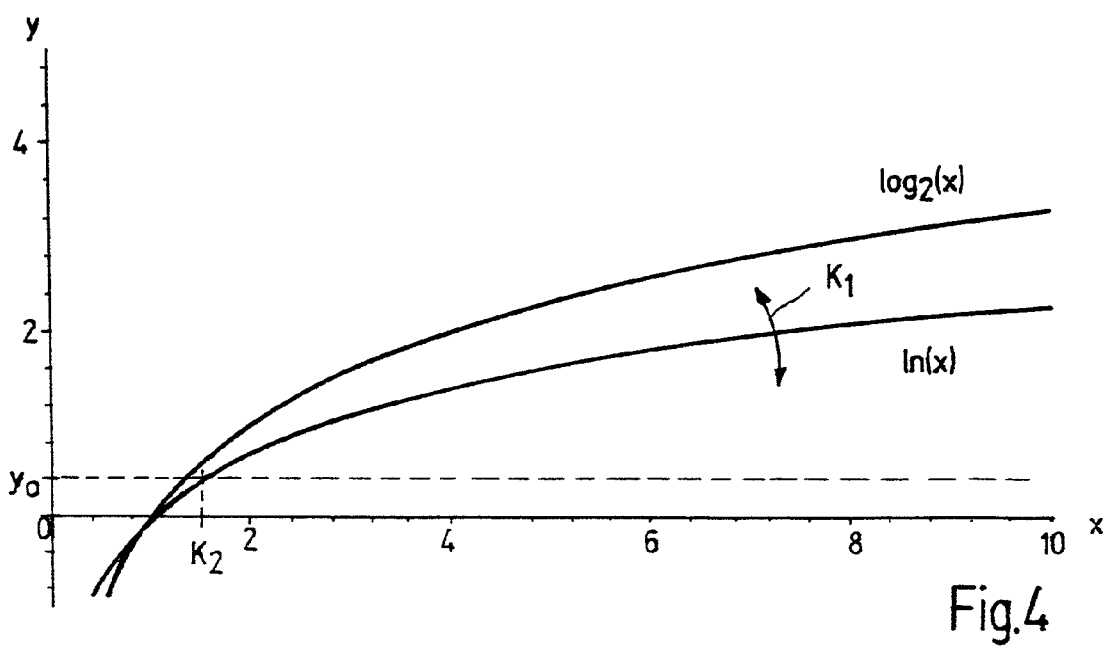
FIG. 4 is an illustration of logarithmic functions to be used in the contouring of faces of locking arrangements according to the invention.

FIG. 4 shows the curves $y=l_n(x)$ and $x=\log_2(x)$ in an x-y diagram.

Both logarithmic functions (or else other logarithmic functions with a different base) are suitable for implementing the projection contour 35.

FIG. 4 also indicates schematically the influence which the constants K1 and K2 can have on the projection contour 35.

It is apparent that the constant K1 essentially determines the gradient of the logarithmic curve. The constant K2 essentially determines the start of the curve for the projection contour 35 starting from the contact point P.

Figure 5:
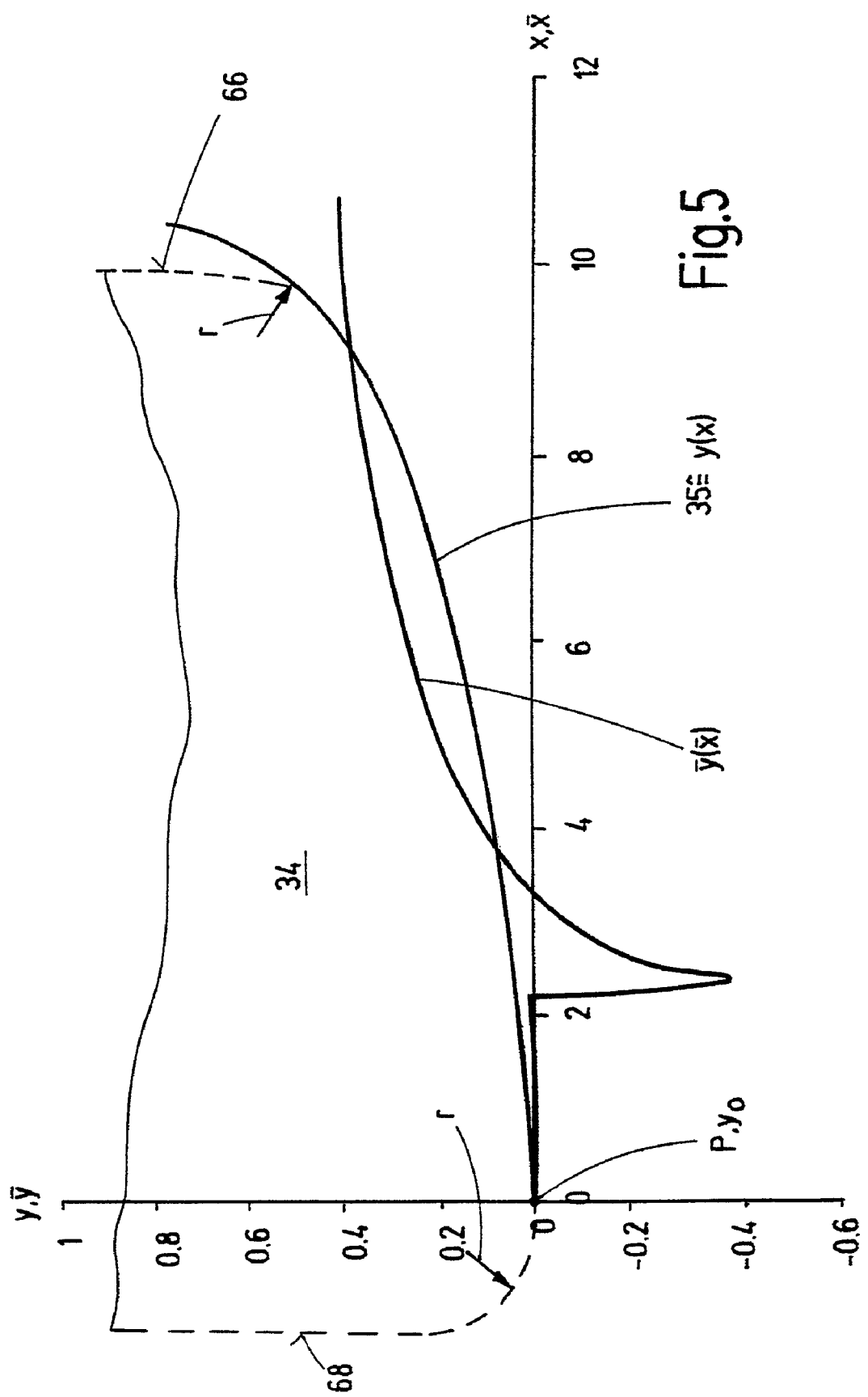
FIG. 5 shows an example of a contour of a parking lock projection of a locking arrangement according to the invention.

FIG. 5 also shows, in a somewhat more precise illustration, the projection 34 with the projection contour 35 according to the invention.

It is apparent that the projection contour 35 forms an "inverse" logarithmic function starting from an original $y_0=P$ (corresponding to FIG. 3). It is also apparent that the projection contour 35 is continuous with the respective sides 66, 68, over a radius r of, for example, 1 mm in both cases.

The projection contour 35 constitutes a section of a logarithmic function after a coordinate transformation. The function on which the projection contour 35 is based is, as already mentioned above, $$\bar{y}=K1 \cdot \text{Logarithm}(\bar{x}+K2).$$

This function $\bar{y}(\bar{x})$ is also illustrated in FIG. 5. The projection contour 35 can be obtained from the function $\bar{y}(\bar{x})$ by the following coordinate transformation:

$$y(x)=\bar{y}(\bar{x}=l_{PS})-\bar{y}, \text{ with } \bar{y}>l_{0,PS}$$

and $$x=l_{PS}-\bar{x}, \text{ with } \bar{x}>l_{0,PS}.$$

Generally it is to be noted that the deflection of the parking lock pawl 30 from the parking lock wheel 22 during ratcheting functions by virtue of the fact that the contact faces or contact lines at which the components touch each other, are preferably not perpendicular to one another but rather are virtually parallel to the tangential direction T of the direction 60 of movement. As a result of the curved projection contour 35, the angle between the tangential direction T and the normal direction to the contact face varies depending on the components abutting or depending on the speed of the vehicle. By virtue of the inventive embodiment of the projection contour 35 it is possible to ensure that the parking lock pawl 30 is always deflected with a relatively low momentum value over the important speed ranges so that the loading of the components overall is reduced if such a fault occurs.

The parking lock arrangement 20 according to the invention can be used in automated change speed gearboxes, in double clutch gearboxes but of course also in conventional automatic torque converter transmissions. Use is generally also possible in manual gearboxes.

Although it would make sense to use the parking lock arrangement according to the invention even if the parking lock arrangement 20 were activated manually, the embodiment of this parking lock arrangement according to the invention is particularly significant if said arrangement is activated in an automated fashion.

What is claimed is:

1. An automotive parking lock arrangement for locking the mobility of a first element which is movably mounted in a first direction, by means of a second element which is movably mounted in a second direction transversely with respect to the first direction, wherein the first element has a toothed contour with at least two teeth and a tooth gap which lies between them, wherein the tooth gap has a tooth gap length in the first direction, wherein the second element has a single projection which has, in the first direction, a projection length which is shorter than the tooth gap length, wherein the projection can be introduced into the tooth gap when there is a movement in the second direction, in order to lock the first element, wherein the teeth each have a face which points towards the second element and has a first contour, and wherein the projection has a face which points towards the first element and has a second contour, wherein the first and second contours are matched to one another in such a way that the projection is deflected by the teeth from becoming inserted into the tooth gap if the first element moves at a speed which is higher than a predetermined locking speed and up to a maximum speed of the first element, wherein the rounding of at least one of the first and second contours corresponds to a mathematical function, the function being at least one of a logarithmic function and an exponential function, and wherein when the rounding of at least one of the first and second contours corresponds to a logarithmic function, at least one of the first and second contours corresponds to a section of the following function:

$$\bar{y}=K1 \cdot \text{logarithm}(\bar{x}+K2),$$

wherein the $\bar{x}$ direction corresponds to the first direction, and the $\bar{y}$ direction corresponds to the second direction, and wherein K1 and K2 are constants which depend essentially on geometric variables of the locking arrangement, including one or more of a tooth gap length, a projection length, a play between tooth sides, and an average approach angle.

2. The locking arrangement as defined in claim 1, wherein when the rounding of at least one of the first and second contours corresponds to a logarithmic function, the logarithmic function is the function of a natural logarithm.

3. The locking arrangement as claimed in claim 1, wherein the constant K1 is also dependent on the average approach angle which is set up between the first and second contours when the first element is moving and the said contours abut against one another.

4. The locking arrangement as claimed in claim 3, wherein the constant K1 includes a factor which is formed by the value of the tangent of the average approach angle.

5. The locking arrangement as claimed in claim 1, wherein when the rounding of the at least one of the first and second contours corresponds to the logarithmic function only the first contour or the second contour is rounded in accordance with a logarithmic function, wherein the other contour extends in the direction of movement.

6. The locking arrangement as claimed in claim 1, wherein at speeds of the first element over an entire range from the locking speed up to the maximum speed the projection is deflected with essentially the same momentum value.

* * * * *